United States Patent

Ezri et al.

(10) Patent No.: US 10,587,318 B2
(45) Date of Patent: Mar. 10, 2020

(54) APPARATUS AND METHOD FOR DERIVING A SUBMATRIX

(71) Applicant: HUAWEI TECHNOLOGIES CO., LTD., Shenzhen, Guangdong (CN)

(72) Inventors: Doron Ezri, Munich (DE); Genadiy Tsodik, Munich (DE); Shimon Shilo, Munich (DE); Oded Redlich, Munich (DE); Yaron Ben-Arie, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/014,232

(22) Filed: Jun. 21, 2018

(65) Prior Publication Data

US 2018/0302132 A1  Oct. 18, 2018

Related U.S. Application Data

(63) Continuation of application No. PCT/EP2015/081006, filed on Dec. 22, 2015.

(51) Int. Cl.
*H04B 7/0456* (2017.01)
*H04B 7/0417* (2017.01)

(52) U.S. Cl.
CPC ......... *H04B 7/0456* (2013.01); *H04B 7/0417* (2013.01)

(58) Field of Classification Search
CPC .... H04B 7/0417; H04B 7/0456; H04B 7/086; H04B 7/0697; H04L 25/03242;
(Continued)

(56) References Cited

U.S. PATENT DOCUMENTS

| 2004/0013212 | A1 | 1/2004 | Benesty et al. | |
| 2010/0144302 | A1* | 6/2010 | Moon | H04B 7/086 455/278.1 |

(Continued)

FOREIGN PATENT DOCUMENTS

| CN | 1725667 A | 1/2006 |
| CN | 101228755 A | 7/2008 |
| CN | 104396153 A | 3/2015 |

*Primary Examiner* — Siu M Lee

(74) *Attorney, Agent, or Firm* — Womble Bond Dickinson (US) LLP

(57) ABSTRACT

An apparatus for deriving a submatrix $\tilde{G}^{-1}$ is described. The apparatus for deriving a submatrix $\tilde{G}^{-1}$ is configured to select an N-elements-column and an N-elements-row of an N×N-Matrix G or $G^{-1}$. The apparatus for deriving a submatrix $\tilde{G}^{-1}$ is configured to rearrange the selected column to the rightest column and the selected row to the lowest row of G or $G^{-1}$ so as to generate a N×N-matrix $G_p$ or $G_p^{-1}$. The apparatus for deriving a submatrix $\tilde{G}^{-1}$ is configured to calculate a submatrix $\tilde{G}^{-1}$ by $$\tilde{G}^{-1} = A - \frac{AbcA}{d^{-1} + c^T A b},$$

wherein the parameters (N−1)×(N−1)-submatrix A, b, d, c are obtained from the $G_p$ or the $G_p^{-1}$; wherein $$G_p = \begin{bmatrix} \tilde{G} & b \\ c^T & d \end{bmatrix},$$

$$G_p^{-1} = \begin{bmatrix} A & \tilde{b} \\ \tilde{c}^T & \tilde{d} \end{bmatrix}.$$

15 Claims, 3 Drawing Sheets

(58) Field of Classification Search
CPC ....... H04L 25/067; H04L 25/021; H04L 1/06;
H04L 1/0631; H04L 2025/03426
See application file for complete search history.

(56) References Cited

U.S. PATENT DOCUMENTS

2011/0058619 A1* 3/2011 Arviv .................. H04B 7/0413
375/267
2013/0308715 A1 11/2013 Young-Han et al.

* cited by examiner

| Number of streams \ Number Of calculations | The state of the art | Method of the present invention |
|---|---|---|
| 1 | 1 | 1 |
| 2 | 13 | 12 |
| 3 | 52 | 50 |
| 4 | 138 | 124 |
| 5 | 300 | 238 |
| 6 | 575 | 400 |
| 7 | 1000 | 620 |
| 8 | 1642 | 910 |
| 9 | 2540 | 1276 |
| 10 | 3765 | 1729 |
| 11 | 5388 | 2276 |
| 12 | 7486 | 2928 |
| 13 | 10144 | 3692 |
| 14 | 13455 | 4580 |
| 15 | 17518 | 5596 |
| 16 | 22348 | 6754 |

Fig. 4

APPARATUS AND METHOD FOR DERIVING A SUBMATRIX

CROSS-REFERENCE TO RELATED APPLICATIONS

This application is a continuation of International Application No. PCT/EP2015/081006, filed on Dec. 22, 2015, the disclosure of which is hereby incorporated by reference in its entirety.

TECHNICAL FIELD

Embodiments of the present invention relate to an apparatus and a method for deriving a submatrix.

BACKGROUND

For example, in a multiple input and multiple output (MIMO) system, a transmitter sends multiple streams by multiple transmit antennas. Assuming the number of streams in a MIMO system is N, e.g., there are at least N transmit antennas being sources of the streams and at least N receive antennas receiving the streams. The MIMO system could be simply represented with the number of the streams, that is, represented as "N×N MIMO" system.

A popular implementation of a MIMO decoder is based on a K-Best search algorithm. The main idea of this decoder is that the possibly transmitted streams are added to the overall metric in an iterative way rather than joint exhaustive search implemented in the optimal Maximum-Likelihood decoder. At each stage of the decoding process, only the K best optional paths are selected according to a predefined metric.

Performance of the K-Best search algorithm relies on an order in which the streams are added to the decoder decision metric. A right order leads to a good performance, while a wrong order can completely ruin the K-Best detection properties. Therefore, a re-ordering algorithm is introduced to choose a best stream for each stage of the K-Best search. The re-ordering can be dependent on the mutual interference between each stream and all the other streams.

According to the re-ordering algorithm, streams are selected and removed at each stage in an iterative calculation. For example, assume a real valued physical channel matrix is denoted as H, and the post-processing Signal-to-Noise-and-Interference ratio (SINR) is defined by the main diagonal entries of the matrix $(G^{-1})_{i,i}=(H^*H)^{-1}$. The stream with the lowest SINR is selected and then removed. Thus, a new channel submatrix $\tilde{H}$ is constructed where the column corresponding to the removed stream is removed. Then, the next steam is chosen from $(\tilde{G}^{-1})_{i,i}$. Therefore, at each step of the reordering process a new inverse submatrix should be computed.

As the number of streams grows, the number of matrix inversions and the size of the inverted matrices grow accordingly. To complete a re-ordering process, the required number of calculating is very huge. That is, in the state of the art, the receiver's implementation, especially the K-Best re-ordering implementation, is very resource-consuming.

SUMMARY

An apparatus and a method for deriving a submatrix are provided so that an effect of improving the calculation of a submatrix and in particular the calculation of an optimal alternative is achieved.

In at least one embodiment, an apparatus for deriving a submatrix $\tilde{G}^{-1}$ is configured to perform operations that comprise
1) selecting an N-elements-column and an N-elements-row of an N×N-Matrix G or $G^{-1}$;
2) rearranging the selected column to the rightest column and the selected row to the lowest row of G or $G^{-1}$ so as to generate a N×N-matrix $G_p$ or $G_p^{-1}$;
3) calculating an (N−1)×(N−1) submatrix $\tilde{G}^{-1}$ by $$\tilde{G}^{-1} = A - \frac{AbcA}{d^{-1} + c^T A b},$$

wherein the parameters A, b, d, c are obtained from the $G_p$ or the $G_p^{-1}$; wherein $$G_p = \begin{bmatrix} \tilde{G} & b \\ c^T & d \end{bmatrix}, G_p^{-1} = \begin{bmatrix} A & \tilde{b} \\ \tilde{c}^T & \tilde{d} \end{bmatrix}.$$

It follows directly from the proceeding description that A is an (N−1)×(N−1) matrix, and b, c are (N−1) vectors, and d is a scalar.

By performing the sequence of operations 1, 2 and 3, the apparatus could, in a MIMO example where N represents the number of streams, remove one stream which corresponds to the selected column and row from the received streams. This stream can be the stream that has the least signal-to-noise ratio (SNR). The apparatus reaches the result comprising fewer alternatives without performing a resource intensive matrix inversion as commonly implemented. The apparatus can be a receiver or a device that interacts with the receiver.

In at least one embodiment, wherein if N is an integer larger than 2, the apparatus is configured to repeatedly perform operations 1 to 3 by defining the last calculated $\tilde{G}^{-1}$ as $G^{-1}$ until N reaches a first predefined value. For example, the first predefined value is 2.

By repeatedly performing the sequence of operations 1, 2 and 3, more calculations needed for removing multiple streams are reduced. Thus, the implementation of the apparatus that acts as a receiver of the streams is more efficient than the state of the art. Especially, when the sequence of operations 1, 2 and 3 is performed with (N−2) times, the efficiency of the apparatus is significant improved compared with the state of the art.

In at least one embodiment, an element at a cross of the selected column and the selected row is the minimum among all the elements of the G or the $G^{-1}$.

The stream corresponding to the column and row which includes the selected minimum element may be the most interfered stream among all the streams. By selecting the element of the matrix, the most interfered stream could be removed. Therefore, it is more efficient for the apparatus to find the best stream for each stage of the K-Best search.

In at least one embodiment, the G is a covariance matrix of a channel matrix H.

When the apparatus is adapted to an N×N MIMO system, all the calculations associated with both physical meaning and mathematical meaning could be performed by the apparatus based on the matrix, which makes it possible to lower the complexity of the apparatus's implementation and therefore reduce the resource consumption of the apparatus. The efficiency of the apparatus is improved.

In at least one embodiment, a method for deriving a submatrix $\tilde{G}^{-1}$, includes
1) selecting an N-elements-column and an N-elements-row of an N×N-Matrix G or $G^{-1}$;
2) rearranging the selected column to the rightest column and the selected row to the lowest row of G or $G^{-1}$ so as to generate a N×N-matrix $G_p$ or $G_p^{-1}$;
3) calculating a submatrix $\tilde{G}^{-1}$ by $$\tilde{G}^{-1} = A - \frac{AbcA}{d^{-1} + c^T Ab},$$

wherein the parameters (N−1)−(N−1)-submatrix A, b, d, c are obtained from the $G_p$ or the $G_p^{-1}$; wherein $$G_p = \begin{bmatrix} \tilde{G} & b \\ c^T & d \end{bmatrix}, G_p^{-1} = \begin{bmatrix} A & \tilde{b} \\ \tilde{c}^T & \tilde{d} \end{bmatrix}.$$

In at least some embodiments, the method achieves the same advantages as described for the apparatus. The method may be carried out with additional method operations, which correspond to the functions carried out by the various implementation forms described for the apparatus.

In at least some embodiments, a computer program comprises a program code for performing, when running on a computer, the method comprising
1) selecting an N-elements-column and an N-elements-row of an N×N-Matrix G or $G^{-1}$;
2) rearranging the selected column to the rightest column and the selected row to the lowest row of G or $G^{-1}$ so as to generate a N×N-matrix $G_p$ or $G_p^{-1}$;
3) calculating a submatrix $\tilde{G}^{-1}$ by $$\tilde{G}^{-1} = A - \frac{AbcA}{d^{-1} + c^T Ab},$$

wherein the parameters (N−1)×(N−1)-submatrix A, b, d, c are obtained from the $G_p$ or the $G_p^{-1}$; wherein $$G_p = \begin{bmatrix} \tilde{G} & b \\ c^T & d \end{bmatrix}, G_p^{-1} = \begin{bmatrix} A & \tilde{b} \\ \tilde{c}^T & \tilde{d} \end{bmatrix}.$$

BRIEF DESCRIPTION OF DRAWINGS

The above aspects and implementation forms of embodiments of the present invention will be explained in the following description of specific embodiments in relation to the enclosed drawings, in which

FIG. 4 shows performance results of an apparatus according to an embodiment of the present invention compared to an apparatus of the state of the art.

DETAILED DESCRIPTION OF EMBODIMENTS

Figure 1:
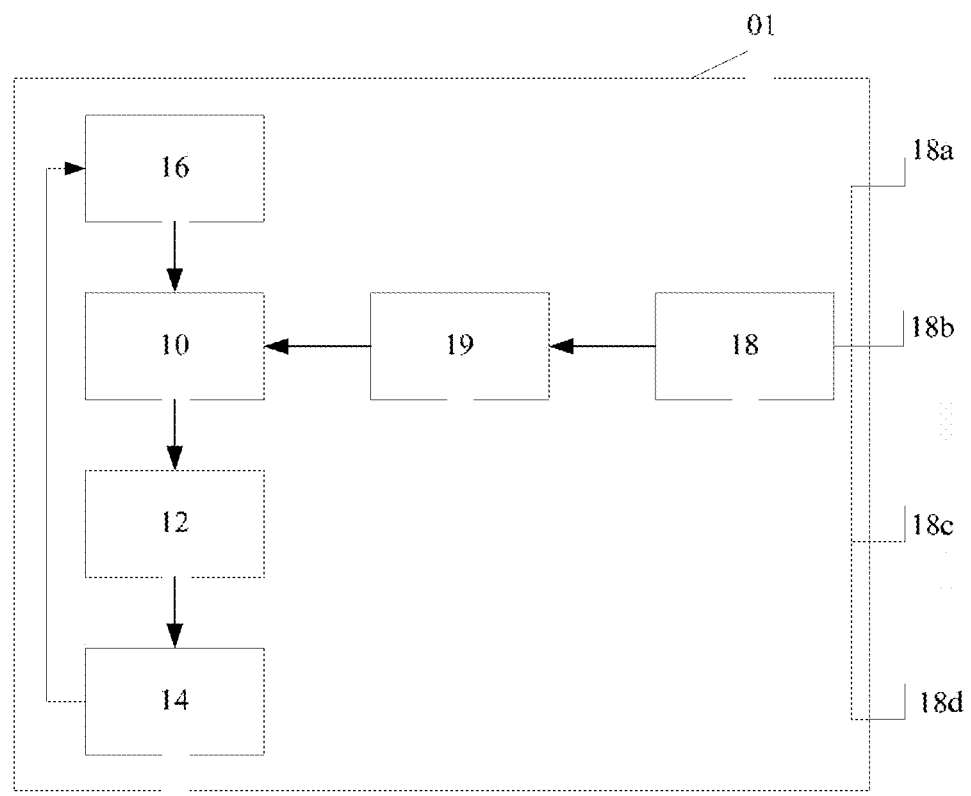
FIG. 1 shows a block diagram of an apparatus according to an embodiment of the present invention.

FIG. 1 shows an apparatus 01 according to an embodiment of the present invention for deriving a submatrix. The apparatus 01 may be a base station, an access point, a client or a user terminal that acts as a receiver in a network. The apparatus 01 can be used in various scenarios, where data between a transmitter and a receiver could be denoted as a matrix, for example, a MIMO system.

In the following examples, the apparatus 01 may act as a receiver in the MIMO system. However, it should be understood that, the data between a transmitter and a receiver is not limited to streams in the MIMO system. The data may be considered as a set of values in a processing.

It should be noted that, an N×N MIMO system is taken as an example to describe embodiments the present invention, where N is the number, namely a quantity, of streams in the system. Correspondingly, a size of the matrix in the examples is defined by the number of streams, e.g., N×N. The number of antennas connected to the apparatus may be equal to or larger than the number of streams.

Figure 2:
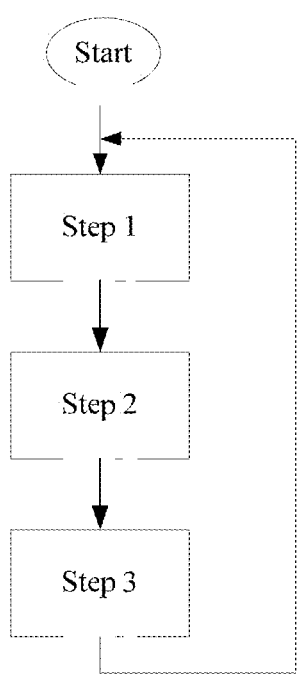
FIG. 2 shows block diagrams of a method according to an embodiment of the present invention.

The apparatus 01 shown as FIG. 1, which may perform the method shown as FIG. 2, includes: a selecting unit 10 configure to perform operation 1, a rearranging unit 12 configure to perform operation 2, and a calculating unit 14 configure to perform operation 3.

As shown in FIG. 2, the operations 1, 2 and 3 performed by the units of the apparatus 01 may be as follows.

Operation 1: selecting an N-elements-column and an N-elements-row of an N×N-Matrix G or $G^{-1}$.

Operation 2: rearranging the selected column to the rightest column and the selected row to the lowest row of G or $G^{-1}$ so as to generate a N×N-matrix $G_p$ or $G_p^{-1}$.

Operation 3: calculating an (N−1)×(N−1) submatrix $\tilde{G}^{-1}$ by $$\tilde{G}^{-1} = A - \frac{AbcA}{d^{-1} + c^T Ab},$$

wherein the parameters A, b, d, c are obtained from the $G_p$ or the $G_p^{-1}$; wherein $$G_p = \begin{bmatrix} \tilde{G} & b \\ c^T & d \end{bmatrix}, G_p^{-1} = \begin{bmatrix} A & \tilde{b} \\ \tilde{c}^T & \tilde{d} \end{bmatrix}.$$

It could be understood that the mathematical operation performed in the operation 3 is performed based on the well-known Schur complementation.

By performing the sequence of operations 1, 2 and 3, the apparatus 01 could remove at least one data set which is corresponding to the selected column and row from the matrix. This could be motivated, for example by an optimization process. The calculations needed for removing this data set are reduced compared with the calculations needed according to the state of the art.

Further, in a scenario where the apparatus 01 acts in a MIMO system, by performing the sequence of operations 1, 2 and 3, the apparatus 01 could remove one stream which is corresponding to the selected column and row from the received streams. The calculations needed for removing this stream are reduced compared with the calculations needed according to the state of the art. That is, during the re-ordering process which is used to choose a best stream for each stage of the K-Best search, at least one step which has an effect to remove one stream is simplified. Thus, implementation of the apparatus that acts as a receiver of the streams is not as complex as the state of the art.

In an optional example, if N is an integer larger than 2, the selecting unit 10 is configured to repeatedly perform operation 1 by defining the last calculated $\tilde{G}^{-1}$ as an input $G^{-1}$ where N is updated with N−1 for each time of performing operation 1. The repetition of performing operation 1 continues until an updated N reaches a first predefined value, for example, 2.

It should be noted that, operations 1, 2 and 3 are performed in a sequence, where each output of a former operation is considered as a trigger and an input of a latter operation. That is, with an input, operation 1 generates an output. Then, operation 2 takes the output of operation 1 as an input and generates an output. Then, operation 3 takes the output of operation 2 as an input and generates an output.

Further, the sequence of operations 1, 2 and 3 could be continuously performed until the size of the output submatrix of operation 3 reaches 2×2. That is, operation 1 may take the output of operation 3 as a trigger and an updated input. Then, operation 2 is trigger by the updated output of operation 1, and operation 3 is triggered by an updated output of operation 2. If an updated output of operation 3 has a size larger than 2×2, the updated output of operation 3 could be considered as an updated input of operation 1, and operations 1, 2 and 3 repeatedly performed for another time.

Optionally, the apparatus 01 may also include a receiving unit 18 and a generation unit 19. For example, the receiving unit 18 connects to several antennas (e.g., 18a, 18b, 18c, 18d as shown in FIG. 1) which are used to receive streams from sources. Optionally, the antennas are considered as being fixed on and thus being a part of the receiving unit 18.

As an example, when the number of streams in the MIMO system including the apparatus 01 is N, it could be assumed that the receiving unit 18 with the N antennas is configured to receive N streams from the sources. The generation unit 19 is configured to generate the G, wherein the G is a covariance matrix of a channel matrix H. The matrix H corresponds to a physical channel between all the transmit antennas and all the receive antennas. Here, all the transmit antennas and all the receive antennas are the antennas being involved in the transmission of the N streams in the MIMO system. That is, the size of the matrix H is denoted with the number of the streams, e.g., N×N. It could be understood, the generated G or its inversion $G^{-1}$ could be an original input of the selecting unit 10, for example, in operation 1.

Figure 3:
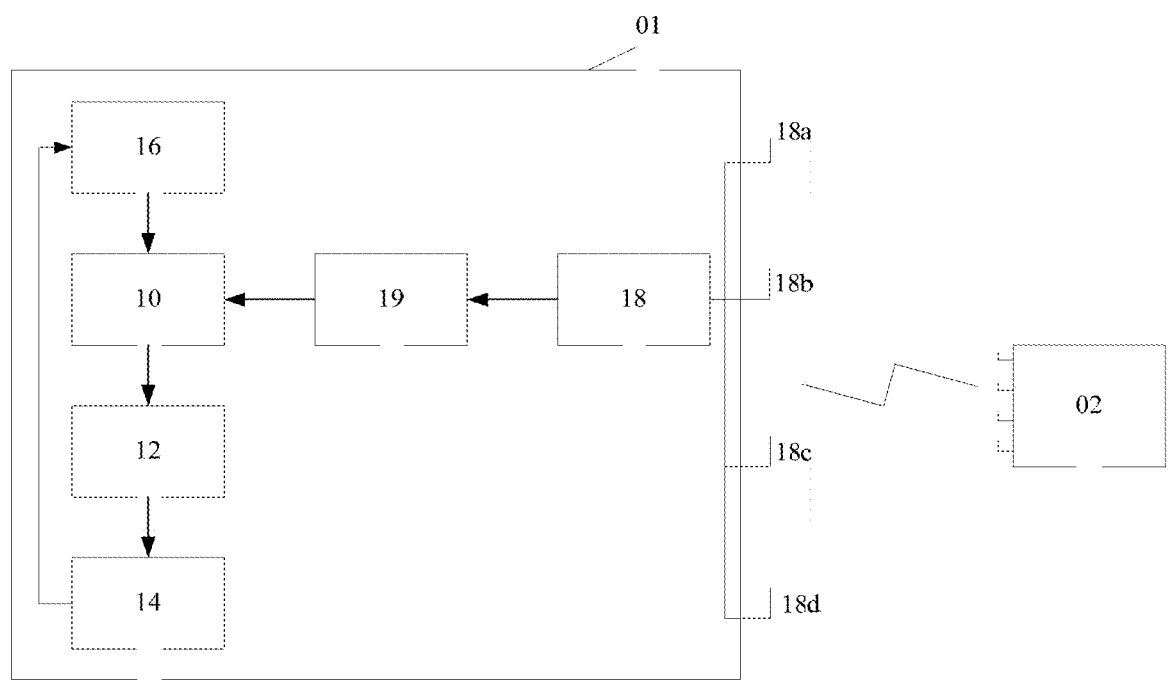
FIG. 3 shows a block diagram of a system according to an embodiment of the present invention.

As shown in FIG. 3, a system 03 includes the apparatus 01 as shown in FIG. 1 and an apparatus 02 acting as a resource of streams.

Assuming there are 4 streams received by the apparatus 01 from the apparatus 02 in the 4×4 MIMO system, an example of the method of deriving the submatrix performed by the apparatus 01 is as follows.

Firstly, when a 4×4 channel matrix is obtained by the receiving unit 18 of the apparatus 01 and represented as H, a covariance matrix is generated by the generating unit 19 of the apparatus 01 and represented as G, where:

$$H = \begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix},$$

$$G = H^*H = \begin{bmatrix} g_{00} & g_{01} & g_{02} & g_{03} \\ g_{10} & g_{11} & g_{12} & g_{13} \\ g_{20} & g_{21} & g_{22} & g_{23} \\ g_{30} & g_{31} & g_{32} & g_{33} \end{bmatrix}.$$

An inverse of the G, which is calculated based on G, is represented as $G^{-1}$, where:

$$G^{-1} = \begin{bmatrix} \bar{g}_{00} & \bar{g}_{01} & \bar{g}_{02} & \bar{g}_{03} \\ \bar{g}_{10} & \bar{g}_{11} & \bar{g}_{12} & \bar{g}_{13} \\ \bar{g}_{20} & \bar{g}_{21} & \bar{g}_{22} & \bar{g}_{23} \\ \bar{g}_{30} & \bar{g}_{31} & \bar{g}_{32} & \bar{g}_{33} \end{bmatrix}.$$

If the minimum of the main diagonal of the inverse matrix $G^{-1}$ is $\bar{g}_{11}$, $\bar{g}_{11}$ is selected, and the selecting unit 10 selects the second stream as a stream to be removed. Correspondingly, the second column and the second row are rearranged.

The rearranged matrix $G_p$ is obtained (Operation 2) based on the matrix G and the selection of the selecting unit 10, where:

$$G_p = \begin{bmatrix} g_{00} & g_{02} & g_{03} & g_{01} \\ g_{20} & g_{22} & g_{23} & g_{21} \\ g_{30} & g_{32} & g_{33} & g_{31} \\ g_{10} & g_{12} & g_{13} & g_{11} \end{bmatrix}.$$

Assume $G_p$ and $G_p^{-1}$ are respectively represented as follows, where the column including b and d is the selected column and the row including $c^T$ and d is the selected row. A is the submatrix maintained when the selected column and row are removed from the matrix $G_p^{-1}$.

$$G_p = \begin{bmatrix} \tilde{G} & b \\ c^T & d \end{bmatrix}, \quad G_p^{-1} = \begin{bmatrix} A & \tilde{b} \\ \tilde{c}^T & \tilde{d} \end{bmatrix}.$$

A, b, c, and d are obtained (i.e., defined) based on $G_p$, and represented as follows.

$$b = \begin{bmatrix} g_{01} \\ g_{21} \\ g_{31} \end{bmatrix}, \quad c = \begin{bmatrix} g_{10} \\ g_{12} \\ g_{13} \end{bmatrix}, \quad d = g_{11}, \quad A = \begin{bmatrix} \bar{g}_{00} & \bar{g}_{02} & \bar{g}_{03} \\ \bar{g}_{20} & \bar{g}_{22} & \bar{g}_{23} \\ \bar{g}_{30} & \bar{g}_{32} & \bar{g}_{33} \end{bmatrix}.$$

Finally, the submatrix $\tilde{G}^{-1}$ could be calculated (Operation 3) according to A, b, d, c, where:

$$\tilde{G}^{-1} = A - \frac{AbcA}{d^{-1} + c^TAb}.$$

In the N×N MIMO system, where N equals to 4, a result of implementation from operation 1 to operation 3 could be considered as the submatrix $\bar{G}^{-1}$, which is a 3×3 submatrix, i.e., a (N−1)×(N−1) submatrix. It can be seen that, after the implementation from operation 1 to operation 3, the interfered stream represented by the second column and the second row (e.g., the second stream in the example above) selected by the selecting unit 10 is removed.

Optionally, the minimum element of the submatrix $\tilde{G}^{-1}$ may be the next element selected by the selecting unit 10. The sequence of operations 1, 2 and 3 are subsequently performed by the apparatus 01.

Compared with the state of the art, when a sequence of operations 1 to operation 3 is implemented for one time, the complexity of the calculation during the re-ordering process is reduced. Furthermore, the more the sequence of operations 1 to 3 is implemented by the apparatus 01, more effect of the reduction of the complexity is obtained.

It should be noted that embodiments of the present invention are not limited to the example above. For example, the matrix G and the matrix $G^{-1}$ have a clear mathematical relationship with each other (one being the inverse of the other). Any calculation or decision based on the matrix G in the example above could be realized based on the submatrix $\tilde{G}^{-1}$.

FIG. 4 provides the numbers of calculations required to complete a re-ordering process associated with the number of real-valued streams. Here, the real part and the imaginary part of each stream are treated as independent orthogonal streams. It can be seen that, to complete a re-ordering process in a same scenario which includes the same number of streams, the number of calculations needed by embodiments of the present invention is less than the number of calculations needed by the state in the art. With more streams, the complexity of the calculations performed by the apparatus can be reduced more.

Embodiments of the invention have been described in conjunction with various MIMO embodiments herein. However, other applications can be understood and effected by those skilled in the art in practicing embodiments of the claimed invention, from a study of the drawings, the disclosure, and the appended claims. A computer program may be stored or distributed on a suitable medium, such as an optical storage medium or a solid-state medium supplied together with or as part of other hardware, but may also be distributed in other forms, such as via the Internet or other wired or wireless telecommunication systems.

The invention claimed is:

1. An apparatus for deriving a submatrix $\tilde{G}^{-1}$, comprising:
a selecting unit to select an N-elements-column and an N-elements-row of an N×N-Matrix G or $G^{-1}$;
a rearranging unit to rearrange the selected column to the rightest column and the selected row to the lowest row of G or $G^{-1}$ so as to generate a N×N-matrix $G_p$ or $G_p^{-1}$;
a calculating unit to calculate a (N−1)×(N−1) submatrix $\tilde{G}^{-1}$ by $$\tilde{G}^{-1} = A - \frac{AbcA}{d^{-1} + c^T A b},$$

wherein the parameters A, b, d, c are obtained from the $G_p$ or the $G_p^{-1}$, wherein A is an (N−1)×(N−1) matrix, b and c are (N−1) vectors, and d is a scalar; wherein $$G_p = \begin{bmatrix} \tilde{G} & b \\ c^T & d \end{bmatrix}, \quad G_p^{-1} = \begin{bmatrix} A & \tilde{b} \\ \tilde{c}^T & \tilde{d} \end{bmatrix}$$

and N represents a number of streams in a multiple input and multiple output (MIMO) system; wherein the apparatus is used in the MIMO system.

2. The apparatus according to claim 1, wherein if N is an integer larger than 2, wherein the selecting unit is configured to repeatedly perform an operation by defining the last calculated $\tilde{G}^{-1}$ as an input $G^{-1}$ until N reaches a first predefined value.

3. The apparatus according to claim 2, wherein the first predefined value is 2.

4. The apparatus according to claim 1, wherein an element at a cross of the selected column and the selected row is the minimum among all the elements of the G or the $G^{-1}$.

5. The apparatus according to claim 1, wherein G is a covariance matrix of a channel matrix H.

6. A method for deriving a submatrix $\tilde{G}^{-1}$, comprising:
selecting an N-elements-column and an N-elements-row of an N×N-Matrix G or $G^{-1}$;
rearranging the selected column to the rightest column and the selected row to the lowest row of G or $G^{-1}$ so as to generate a N×N-matrix $G_p$ or $G_p^{-1}$;
calculating a (N−1)×(N−1) submatrix $\tilde{G}^{-1}$ by $$\tilde{G}^{-1} = A - \frac{AbcA}{d^{-1} + c^T A b},$$

wherein the parameters A, b, d, c are obtained from the $G_p$ or the $G_p^{-1}$, wherein A is an (N−1)×(N−1) matrix, b and c are (N−1) vectors, and d is a scalar; wherein $$G_p = \begin{bmatrix} \tilde{G} & b \\ c^T & d \end{bmatrix}, \quad G_p^{-1} = \begin{bmatrix} A & \tilde{b} \\ \tilde{c}^T & \tilde{d} \end{bmatrix}$$

and N represents a number of streams in a multiple input and multiple output (MIMO) system for use in the MIMO system; wherein the method is used in the MIMO system.

7. The method according to claim 6, wherein if N is an integer larger than 2, the selecting operation is repeatedly performed by defining the last calculated $\tilde{G}^{-1}$ as an input $G^{-1}$ until N reaches a first predefined value.

8. The method according to claim 7, wherein the first predefined value is 2.

9. The method according to claim 6, wherein an element at a cross of the selected column and the selected row is the minimum among all the elements of the G or the $G^{-1}$.

10. The method according to claim 6, the method further comprising:
receiving, by N receive antennas, streams from N transmit antennas; and
generating the G, wherein the G is a covariance matrix of a channel matrix H.

11. A non-transitory machine-readable medium comprising computer program instructions stored thereon for performing, when executed on a computer, operations comprising:
selecting an N-elements-column and an N-elements-row of an N×N-Matrix G or $G^{-1}$;
rearranging the selected column to the rightest column and the selected row to the lowest row of G or $G^{-1}$ so as to generate a N×N-matrix $G_p$ or $G_p^{-1}$;
calculating a (N−1)×(N−1) submatrix $\tilde{G}^{-1}$ by $$\tilde{G}^{-1} = A - \frac{AbcA}{d^{-1} + c^T A b},$$

wherein the parameters A, b, d, c are obtained from the $G_p$ or the $G_p^{-1}$, wherein A is an (N−1)×(N−1) matrix, b and c are (N−1) vectors, and d is a scalar; wherein $$G_p = \begin{bmatrix} \tilde{G} & b \\ c^T & d \end{bmatrix}, \quad G_p^{-1} = \begin{bmatrix} A & \tilde{b} \\ \tilde{c}^T & \tilde{d} \end{bmatrix}$$

and N represents a number of streams in a multiple input and multiple output (MIMO) system for use in the MIMO system; wherein the operations are used in the MIMO system.

12. The non-transitory machine-readable medium according to claim 11, wherein if N is an integer larger than 2, the selecting operation is repeatedly performed by defining the last calculated $\tilde{G}^{-1}$ as an input $G^{-1}$ until N reaches a first predefined value.

13. The non-transitory machine-readable medium according to claim 12, wherein the first predefined value is 2.

14. The non-transitory machine-readable medium according to claim 11, wherein an element at a cross of the selected column and the selected row is the minimum among all the elements of the G or the $G^{-1}$.

15. The non-transitory machine-readable medium according to claim 11, the operations further comprising:
  receiving, by N receive antennas, streams from N transmit antennas; and
  generating the G, wherein the G is a covariance matrix of a channel matrix H.

* * * * *